Feb. 8, 1944. S. C. SCULLY ET AL 2,340,902
METHOD OF MAKING BEARINGS
Filed Aug. 3, 1940 4 Sheets-Sheet 2
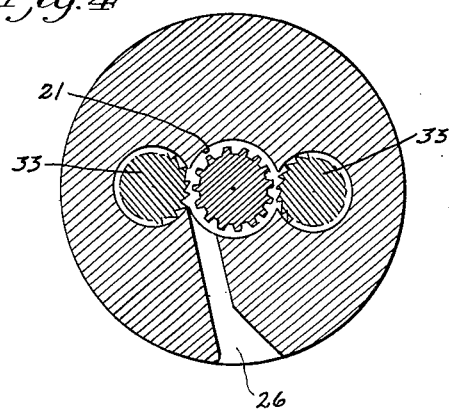
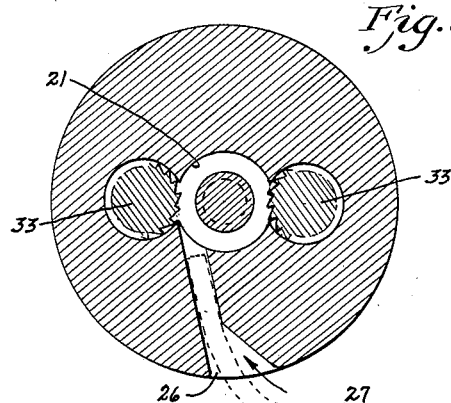
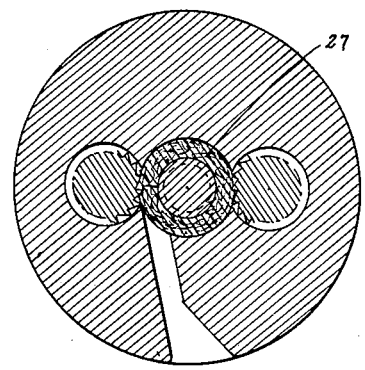
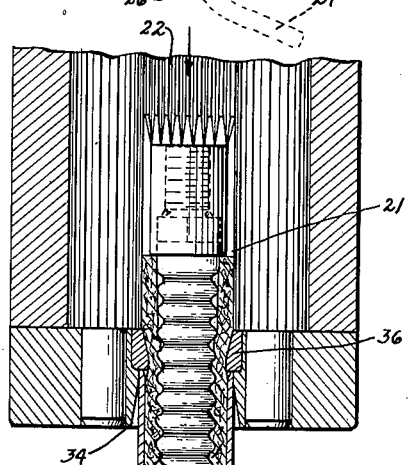
INVENTOR.
Samuel C. Scully &
Frank H. Delahunty
BY
Barnes, Kisselle, Laughlin & Raisch
ATTORNEYS Feb. 8, 1944. S. C. SCULLY ET AL 2,340,902
METHOD OF MAKING BEARINGS
Filed Aug. 3, 1940 4 Sheets-Sheet 3

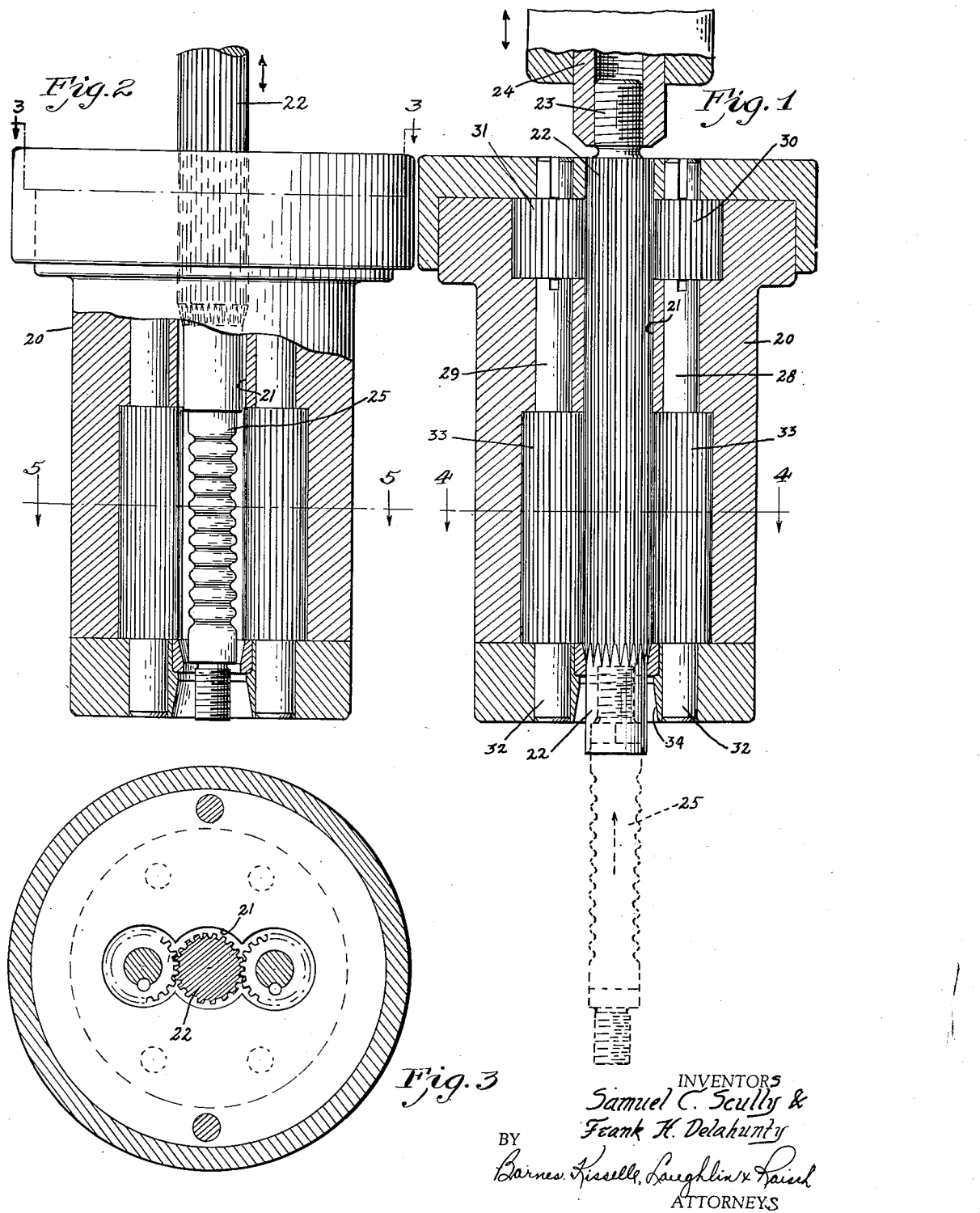

INVENTORS
Samuel C. Scully &
Frank H. Delahunty
BY Barnes, Kisselle, Laughlin & Raisch
ATTORNEYS Feb. 8, 1944.   S. C. SCULLY ET AL   2,340,902
METHOD OF MAKING BEARINGS
Filed Aug. 3, 1940   4 Sheets-Sheet 4
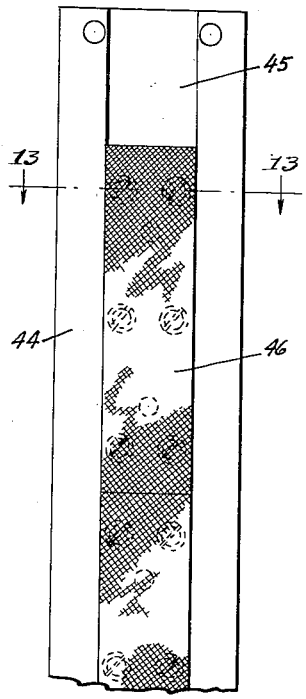
Fig. 12
Fig. 13
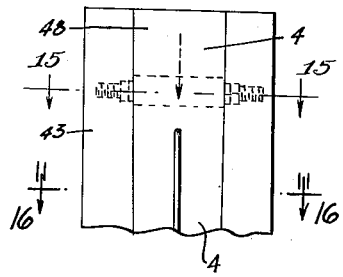
Fig. 14
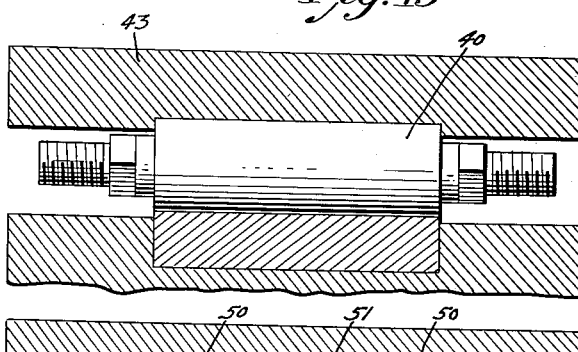
Fig. 15
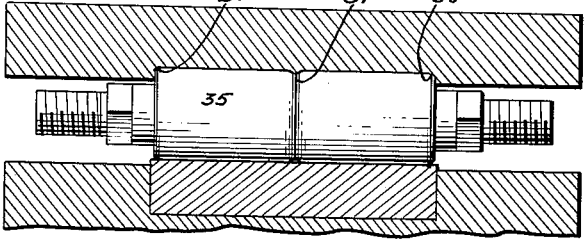
Fig. 16
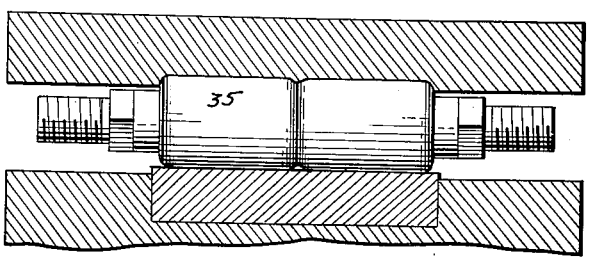
Fig. 17
INVENTORS
Samuel C. Scully &
BY Frank H. Delahunty
Barnes, Kisselle, Laughlin & Raisch
ATTORNEYS Patented Feb. 8, 1944

2,340,902

UNITED STATES PATENT OFFICE 2,340,902

METHOD OF MAKING BEARINGS

Samuel C. Scully and Frank H. Delahunty, Detroit, Mich., assignors to O. & S. Bearing Company, Detroit, Mich., a corporation of Michigan Application August 3, 1940, Serial No. 350,942

4 Claims. (Cl. 29—149.5)

This invention relates to a method of making bearings and has particularly to do with a method for manufacturing permanent lubricated bearings.

The bearings to be manufactured under the present method are those which include a lubricant impregnated compressed fibrous material between the metallic bearing parts to serve as a bushing which is permanently lubricated.

It is an object of the present invention to provide a method for manufacturing these bearings whereby the fibrous material may be subjected to the proper compression as the bearing is assembled and also a means for wrapping the fibrous material on the inner bearing member and holding it there prior to the assembly of the outer bearing member.

A further object of the invention is to provide a method for forming the outer bearing member after assembly to lock it in place.

Other objects and features of the invention relating to the steps of the method will appear in the following description and claims.

In the drawings:

Fig. 1 is a sectional view of a bearing assembly unit showing the parts in position to receive the inner bearing member.

Fig. 2 is a view similar to Fig. 1 illustrating the parts with the inner bearing member ready to receive a fabric covering.

Fig. 3 is a section on the lines 3—3 of Fig. 2.

Fig. 4 is a sectional view taken on the lines 4—4 of Fig. 1.

Fig. 5 is a sectional view on the lines 5—5 of Fig. 2 showing the bearing material about to enter the machine.

Fig. 6 is a view similar to Fig. 5 showing the bearing material in wrapped position.

Fig. 7 is a view showing the assembly of the outer bearing member around the fabric and inner bearing member.

Fig. 12 is a sectional view taken on the lines 12—12 of Fig. 8.

Fig. 13 is a sectional view taken on the lines 13—13 of Fig. 12.

Fig. 14 is a partial elevation of the reciprocating member of Figs. 8 to 11 showing the relationship of the bearing member to the machine.

Fig. 15 is a section taken on the lines 15—15 of Figs. 8 and 14.

Fig. 16 is a sectional view on the lines 16—16 of Figs. 8 and 14.

Fig. 17 is a sectional view on the lines 17—17 of Fig. 8.

Figures 8, 9, 10, 11:
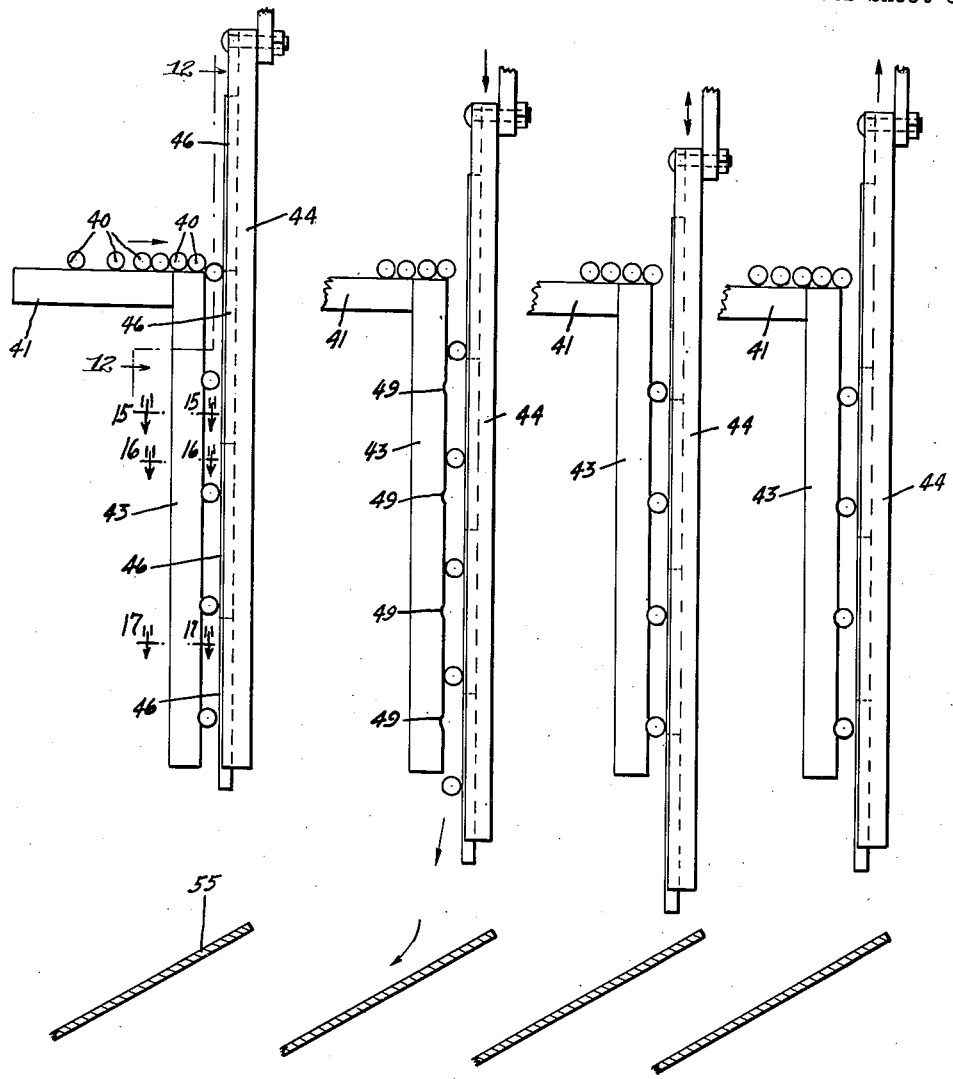
Figs. 8, 9, 10 and 11 show various positions of a machine for handling the assembled bearing and completing the steps in the manufacture.

Referring to the drawings, in Fig. 1 a head 20 is provided with an axial recess 21 in which is slidably and rotatably mounted a fluted shaft 22. The top end of shaft 22 is threaded at 23 and a rotating and reciprocating spindle 24 is threaded on the portion 23. The lower end of the shaft 22 is provided with a recess which is adapted to receive and retain one end of an inner bearing member 25 shown in dotted outline in Fig. 1. The section shown in Fig. 4 illustrates an opening 26 which is tangential to the axial recess 21. The axial length of the opening 26 is substantially equal to the length of the bearing member 25 and is adapted to receive a strip 27 of fibrous material which is fed into the axial recess to surround the inner bearing member, as will be later described. Parallel with and adjacent shaft 22 are shafts 28 and 29 mounted in the head 20. At the upper end of shafts 28 and 29, as viewed in Fig. 1, are keyed gears 30 and 31 which mesh with the fluted shaft 22. The lower end of the shafts 28 and 29 have bearing portions at 32. Adjacent the opening 26 are feeding rolls 33 mounted on shafts 28 and 29. These feeding rolls are provided with teeth, as shown in Fig. 4, and will be driven by the rotation of shaft 22 through the gears 30 and 31.

The steps which result in the wrapping of the inner bearing member 25 may now be described in connection with Figs. 1 to 6. At the beginning of the operation the spindle 24 moves shaft 22 to its lowermost position, as viewed in Fig. 1. The bearing member 25 may then be inserted in the socket of the shaft 22 which is then shifted axially so that the bearing member is drawn up into the head 20 to a predetermined position, as shown in Fig. 2. The shaft 22 is then rotated and a strip of fibrous material of predetermined length is fed into the opening 26 to the axial recess 21 where it is caught by the rotating rolls 33 and fed around the bearing member 25 until the ends of the strip meet, as shown in Fig. 6.

The next step involves getting the inner bearing member 25 and the fibrous material 27 into the outer bearing member or shell. The lower end of head 20 is provided with a tapered recess 34 into which the outer shell 35 may be inserted, as shown in Fig. 7. The inward movement of the shell is stopped by the lower shoulder of a thimble or die 36 which has an inner diameter smaller than the inner diameter of the shell 35 with a tapered portion leading from recess 21.

When the shell 35 is properly positioned and supported by a mandrel 37, the shaft 22 may be forced downwardly. In this movement the fibrous material 27 will be compressed around the inner bearing member 25 and fed into the outer shell 35 where the compression of the fibrous material will be maintained. A hole 38 in the mandrel 37 receives the lower end of the inner bearing member during such movement. After this step, the completed bearing is released from the shaft 22 and has an appearance as shown at 40 in Fig. 15, and the process is repeated as described.

The assembled bearings 40 are fed along a table 41, Figs. 8 to 11, where they drop into a vertical channel formed by a stationary wall 43 and a reciprocating member 44. The reciprocating member 44 is provided with a channel 45 in which are located friction plates 46. These plates are shown in Figs. 12 to 17 and are preferably provided with a knurled surface to offer frictional resistance. The stationary wall 43 is provided with a channel 48 in which the bearings roll. At intervals along the channel are small recesses 49 into which the bearings will come to rest during the upward movement of the member 44. The shape of the channel 48 is altered as the bearing members proceed on their downward course so that the outer shape of the bearing member 35 is likewise altered. For example, in Fig. 16, the channel is shown having slightly rounded corners 50 and a knurl 51 at the central portion. These formations are more pronounced in Fig. 17 which is the final formation of the bearing. When the bearings reach the bottom of the channel formed by the wall 43 and member 44, they fall onto a guide 55 and are directed to a storage chamber not shown.

We claim:

1. A method of forming a bearing assembly which comprises holding an inner bearing member, wrapping said inner bearing member with fibrous material, laterally compressing said fibrous material around the inner bearing member, enclosing said fibrous material and inner bearing member in an outer bearing member and shaping said outer bearing member by rolling it between relatively movable plates to substantially lock said bearing assembly together.

2. A method of forming a bearing assembly which comprises holding an inner bearing member in a cylindrical recess, laterally feeding a strip of fibrous material into said recess, circumferentially feeding said fibrous material around the wall of said recess whereby said inner bearing member is wrapped in said fibrous material, and forcing said inner bearing member and fibrous material axially out of said recess through a restricting die into an outer bearing member.

3. A method of forming a bearing assembly which comprises holding an inner bearing member in a cylindrical recess, laterally feeding a strip of fibrous material into said recess, circumferentially feeding said fibrous material around the wall of said recess whereby said inner bearing member is wrapped in said fibrous material, and axially extruding said inner bearing member and fibrous packing through a restricting die whereby said fibrous material is tightly packed on said inner bearing member and enclosing the same within an outer bearing member while still restricted.

4. A method of forming a bearing assembly which comprises holding an inner bearing member in a cylindrical recess, laterally feeding a strip of fibrous material into said recess, circumferentially feeding said fibrous material around the wall of said recess whereby said inner bearing member is wrapped in said fibrous material, forcing said inner bearing member and fibrous material axially out of said recess through a restricting die and into an outer bearing member while still restricted, and subjecting said outer bearing member to forming means to substantially lock said bearing assembly together by rolling the outer member between relatively movable plates.

SAMUEL CARL SCULLY.
FRANK H. DELAHUNTY.